US006165605A

United States Patent [19]

Fujita et al.

[11] Patent Number: 6,165,605

[45] Date of Patent: Dec. 26, 2000

[54] PREFORM STRUCTURES, COMPOSITE ALUMINIUM OR ALUMINIUM ALLOY COMPONENTS COMPOSITED WITH PREFORM STRUCTURES AND METHODS FOR PRODUCING THESE

[75] Inventors: Makoto Fujita; Nobuyuki Oda; Kazuo Sakamoto; Yukihiro Sugimoto; Yukio Yamamoto, all of Hiroshima, Japan

[73] Assignee: Mazda Motor Corporation, Hiroshima-ken, Japan

[21] Appl. No.: 08/822,061

[22] Filed: Mar. 24, 1997

[30] Foreign Application Priority Data

| | | | |
|---|---|---|---|
| Mar. 26, 1996 | [JP] | Japan | 7-097604 |
| Nov. 26, 1996 | [JP] | Japan | 7-331578 |

[51] Int. Cl.[7] .................. B32B 5/08

[52] U.S. Cl. .................. 428/312.8; 428/311.51; 428/313.9; 428/317.9; 428/614

[58] Field of Search .................. 442/59; 428/472, 428/472.2, 471, 614, 539.5, 312.6, 313.9, 317.9, 311.51, 312.8, 325; 501/95, 95.1

[56] References Cited

U.S. PATENT DOCUMENTS

| | | | |
|---|---|---|---|
| 4,814,127 | 3/1989 | Toyada | 264/56 |
| 4,840,763 | 6/1989 | Freitag | 264/65 |
| 4,994,418 | 2/1991 | Yamakawa et al. | 501/95 |
| 4,995,444 | 2/1991 | Jolly et al. | 164/97 |
| 5,163,499 | 11/1992 | Newkirk et al. | 164/98 |
| 5,371,050 | 12/1994 | Belitskus et al. | 501/95 |
| 5,482,778 | 1/1996 | Aghajanian et al. | 428/472 |
| 5,654,246 | 8/1997 | Newkirk et al. | 501/80 |
| 5,679,041 | 10/1997 | Sokol et al. | 442/59 |
| 5,876,659 | 3/1999 | Yasutomi et al. | 264/638 |

FOREIGN PATENT DOCUMENTS

| | | | |
|---|---|---|---|
| 63-54057 | 10/1988 | Japan | C22C 1/10 |
| 63-295050 | 12/1988 | Japan | B22D 19/14 |
| 3-151158 | 6/1991 | Japan | B22D 19/14 |

*Primary Examiner*—John J. Zimmerman
*Attorney, Agent, or Firm*—Sidley & Austin; Hugh A. Abrams

[57] ABSTRACT

A method is provided for producing a preform structure which is used in a composite aluminium or aluminium alloy component in which a base metal of an aluminium or aluminium alloy is reinforced with reinforcing materials. A slurry is prepared by mixing reinforcing materials including ceramic particles and first whiskers with burning-away powders and liquid. Liquid components contained in the slurry are filtered to provide a dehydrated structure. Thereafter a preform structure is produced by sintering the ceramic particles with the first whiskers after burning the burning-away powders in the dehydrated structure.

11 Claims, 13 Drawing Sheets

PREFORM STRUCTURES, COMPOSITE ALUMINIUM OR ALUMINIUM ALLOY COMPONENTS COMPOSITED WITH PREFORM STRUCTURES AND METHODS FOR PRODUCING THESE

BACKGROUND OF THE INVENTION

1. Field of the Invention

The present invention relates to a preform structure, a composite aluminium or aluminium alloy component composited with the preform structure, and methods for producing the preform structure and the composite aluminium or aluminium alloy component composited with the preform structure.

2. Description of the Related Art

Components such as ring grooves of pistons disposed in an automobile engine, brake disk rotors in a braking system, and valve lifters of the engine have sliding portions which slide on other members, and such sliding portions need a desired wear and abrasion resistance. It is conventionally known that when such components are made of an aluminium or aluminium alloy, the aluminium or aluminium alloy is used as a base metal and is reinforced with a reinforcing material having a good wear and abrasion resistance by the molten metal mixing method.

However, in the above-mentioned conventional method, all of the components are reinforced with the reinforcing material as well as the sliding portions which need the wear and abrasion resistance. Therefore, a very large amount of the reinforcing material has to be used and thus manufacturing cost is increased. Further, the reinforcing or compositing process becomes complex, since the molten metal with a desired viscosity has to be provided so that the reinforcing material is not concentrated in the molten metal by floating thereof.

It is disclosed in, for example, Japanese Patent Laid-Open No. 3-151158 that a preform structure is made by sintering a mixture of SiC whiskers and aluminium alloy powders to be a predetermined shape, after which the preform structure is set on a predetermined place in a casting mould, molten aluminium is then poured at a high pressure into the casting mould, and the preform structure is composited with the molten aluminium.

According to this method, the component partially having a reinforced portion can be made. However, since too many SiC whiskers tend to be contained in the reinforced portion, the pouring pressure of the molten aluminium has to be high during the reinforcing process, and it is difficult to produce a necessary composite material having a low volume ratio. Therefore, the manufacturing cost becomes high and the obtained composite material might break other components which slide thereon.

Japanese Patent Publication No. 63-54057 discloses a method for efficiently and inexpensively producing an alloy with a good efficiency, a low cost and a predetermined structure. A porous body or preform structure are made of fine solid members which are a compound of a first metal and oxygen. The porous body is dipped into a molten metal including a second metal, and then the molten metal is pressurized so as to infiltrate into the porous body. The oxide of the first metal is deoxidized while the second metal is oxidized. Thus, an alloy is produced by one portion of the molten metal and the porous body, while the remaining portion of the molten metal becomes the metal oxide which is finely dispersed into the alloy.

Japanese Patent Laid-Open No. 63-295050 discloses a method for producing a composite metal component. According to the method, a small amount of reinforcing material is homogeneously dispersed into the metal components. That is, a scaffolding structure having a predetermined pattern is made of a fiber material including cellulose and the like and plastic fibers. Fibers and particles of reinforcing materials are dispersed along the scaffolding structure, and thereafter the pattern of the scaffolding structure is dissipated or decomposed in the molten metal so as to be reinforced or composited with the molten metal. Further, alumina fibers and the like are used as the pattern so as to assure the reinforcing material is dispersed.

Ceramic particles such as titanium dioxide and SiC are low in cost and have a wear and abrasion resistance as reinforcing materials, and therefore they are more preferable than whiskers, short fibers and the like. When a preform structure is made of reinforcing materials composed of such ceramic particles, which particles have been pressurized and sintered as disclosed in Japanese Patent Laid-Open No. 3-151158, the volume ratio of the ceramic particles becomes high, the volume ratio is difficult to control as in the case when reinforcing materials are made of the whiskers, and the volume ratio has a lower limit. Therefore, when the high pressure aluminium casting is done, the molten aluminium or alloy is not dispersed into the preform structure and therefore the preform structure might be broken by the high pressure.

The above-mentioned method disclosed in Japanese Patent Publication No. 63-54057 can be applied when an oxide such as titanium dioxide is used as the ceramic particles, but can not be applied when a non-oxide is used. However, even if titanium dioxide is used as the ceramic particles and this method is applied, the preform structure is still easily broken during oxidation and deoxidation reactions. Further, since a widely used aluminium alloy includes silicon, the titanium is produced by a deoxidation reaction of the titanium dioxide and the titanium is combined with the silicon and the aluminium to produce an Al—Ti—S compound. Though this compound increases hardness and wear and abrasion resistance of the preform structure, the preform structure becomes brittle and thus is more easily broken.

When the above-mentioned method disclosed in Japanese Patent Laid-Open No. 63-295050 is used, the amount of the reinforcing materials can be preferably decreased, but the reinforcing materials can not be homogeneously dispersed along the pattern and therefore the wear and abrasion resistance of the preform structure is decreased. Further, when the pattern is dissipated by the molten aluminium, an aluminium carbide is produced by which the preform structure becomes brittle. Still further, when alumina fibers and the like are used as the pattern, a large number of the alumina fibers have to be added, and therefore the strength of the preform structure is lowered and it is difficult to infiltrate into the preform structure because of a bad air permeability.

SUMMARY OF THE INVENTION

It is therefore an object of the present invention to provide an improved preform structure whose volume ratio can be easily decreased under the condition that reinforcing materials are homogeneously dispersed therein, and which has enough strength not to be broken during a casting process, and to provide a method for producing such a preform structure.

It is another object of the present invention to provide to provide an improved composite material which is reinforced with reinforcing material or ceramic particles which are low in cost and have a high wear and abrasion resistance, and to provide a method for producing such a composite material.

These and other objects are achieved according to the present invention by providing a method for producing a preform structure which is used in a composite aluminium or aluminium alloy component in which a base metal of an aluminium or aluminium alloy is reinforced with reinforcing materials, comprising the steps of preparing a slurry by mixing reinforcing materials including ceramic particles and first whiskers with burning-away powders and liquid, filtering liquid components contained in the slurry to provide a dehydrated structure, and sintering the ceramic particles with the first whiskers after burning the burning-away powders in the dehydrated structure.

According to another aspect of the present invention, a preform structure is provided which is used in a composite aluminium or aluminium alloy component in which a base metal of an aluminium or aluminium alloy is reinforced with reinforcing materials, comprising reinforcing materials including ceramic particles and first whiskers, the ceramic particles being sintered with the first whiskers under the condition that the ceramic particles are adhered to the surfaces of the first whiskers.

According to still another aspect of the present invention, a method for producing a composite aluminium or alloy component is provided in which a base metal of an aluminium or aluminium alloy is reinforced with reinforcing materials, comprising the steps of preparing a slurry by mixing reinforcing materials including ceramic particles and first whiskers with burning-away powders and liquid, filtering liquid components contained in the slurry to provide a dehydrated structure, sintering the ceramic particles with the first whiskers after burning the burning-away powders in the dehydrated structure to provide a preform structure, and pouring molten aluminium or aluminium alloy into the preform structure to composite the aluminium or alloy and the preform structure.

According to still another aspect of the present invention, a composite aluminium or alloy component is provided in which a base metal of an aluminium or aluminium alloy is reinforced with reinforcing materials, comprising a preform structure including reinforcing materials having ceramic particles and first whiskers, the ceramic particles being sintered with the first whiskers under the condition that the ceramic particles are adhered to the surfaces of the first whiskers, aluminium or aluminium alloy being composited with the preform structure.

The above and other objects and features of the present invention will be apparent from the following description by taking reference with accompanying drawings employed for preferred embodiments of the present invention.

DESCRIPTION OF THE PREFERRED EMBODIMENTS

The present invention will now be explained with reference to preferred embodiments and the drawings.

Figure 1:
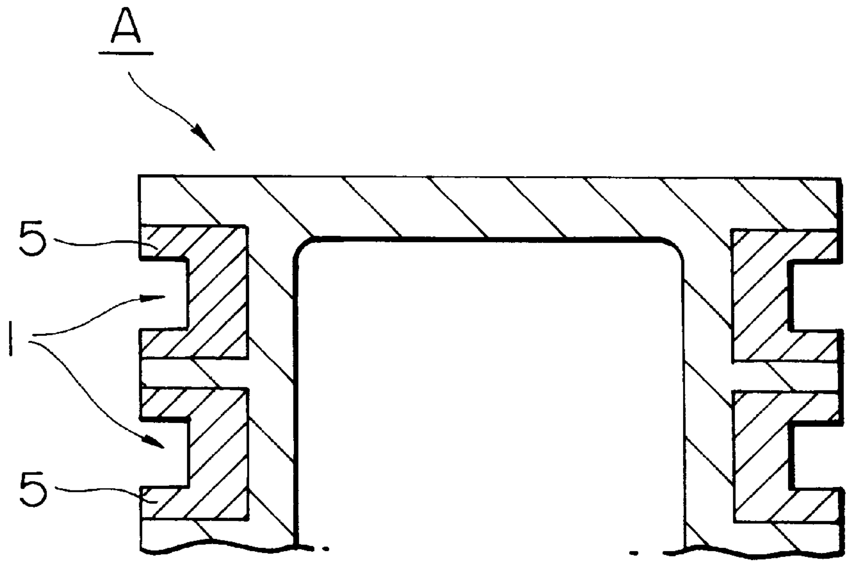
FIG. 1 is a sectional view of ore portion of a piston component for an automobile engine according to an embodiment of the present invention.

A piston component A of an automobile engine according to an embodiment of the present invention is partially shown in FIG. 1. The piston component A is a composite aluminium or aluminium alloy component whose base metal is an aluminium or aluminium alloy and in which only piston ring grooves 1 are reinforced with reinforcing materials.

As the base metal above mentioned, AC8A is used which is provided in Japanese Industrial Standard (JIS) H5202. The reinforcing materials include ceramic particles and whiskers, titanium dioxide ($TiO_2$) being used as the ceramic particles and aluminium borate whiskers being used as the whiskers. As the ceramic particles, aluminium oxide ($Al_2O_3$), SiC and the like can also be used. The whiskers are not short fibers but crystals grown to have a needle like shape. The whiskers may be real whiskers which are naturally grown crystals of metal and the like, or may be non-real whiskers grown from a liquid phase or gas phase or by chemical reactions. As the whiskers, SiC whiskers and the like can also be used.

The piston ring grooves 1 are infiltrated with AC8A which is a base metal or an aluminium or aluminium alloy between the ceramic particles or $TiO_2$ particles, and the binding force of the $TiO_2$ particles is strengthen since the aluminium borate whiskers are homogeneously dispersed between the $TiO_2$ particles.

Before the AC8A is infiltrated into the piston ring grooves 1, two preform structures 5 are provided each of which is provided with a groove portion in the center in a vertical direction along the circumference thereof. The respective preform structures 5 are obtained by the $TiO_2$ particles being sintered with aluminium borate whiskers under the condition that the $TiO_2$ particles are adhered to the surfaces of the aluminium borate whiskers. The preform structures 5 have pores or voids which are between the $TiO_2$ particles, and the molten metal of AC8A is infiltrated into the pores or voids by a high-pressure casting. Inorganic binders may be additionally added so that the $TiO_2$ particles are sintered with the aluminium borate whiskers through the inorganic binders.

The respective preform structures 5 include the reinforcing materials whose volume ratio is equal to or less than 30% relative to the whole volume of the preform structure so as to obtain a desired wear and abrasion resistance.

The volume ratio of the aluminium borate whiskers relative to the volume of the $TiO_2$ particles in the reinforcing materials is 10–40%. That is, when the volume ratio of the aluminium borate whiskers is less than 10%, the permeability of the molten metal is not sufficient and the strength of the preform structures 5 is as same as that of the preform structure having only $TiO_2$ particles, and therefore the strength of the perform structures 5 can not be increased. When this volume ratio is greater than 40%, the permeability of the molten metal is sufficient. However, the preform structures 5 include many more whiskers than ceramic particles and therefore the rigidity of the preform structures is decreased and the preform structures are easily compressed and broken during the reinforcing process using the molten metal. Further, when this volume ratio is greater than 40%, the cost of the preform structures is increased because of the large number of the aluminium borate whiskers needed and the ratio of pores or voids is decreased. As a result, the above range of 10–40% is preferable.

Figure 2:
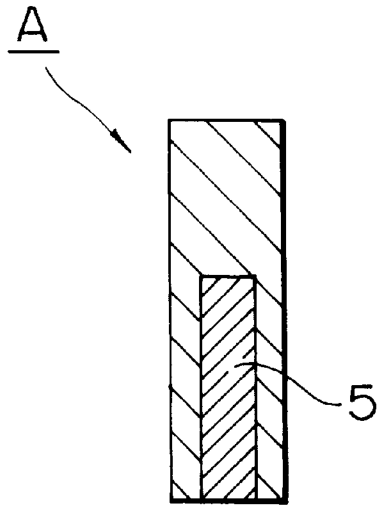
FIG. 2 is a sectional view of the piston component having a simplified shape.

Methods for manufacturing the preform structures 5 and the piston components A which are obtained by compositing the preform structures 5 and the aluminium or aluminium alloy AC8A will be explained hereinafter. In order to make them easy to understand, a preform structure 5 and a piston component A each having a simplified shape are shown in FIG. 2.

Figure 3:
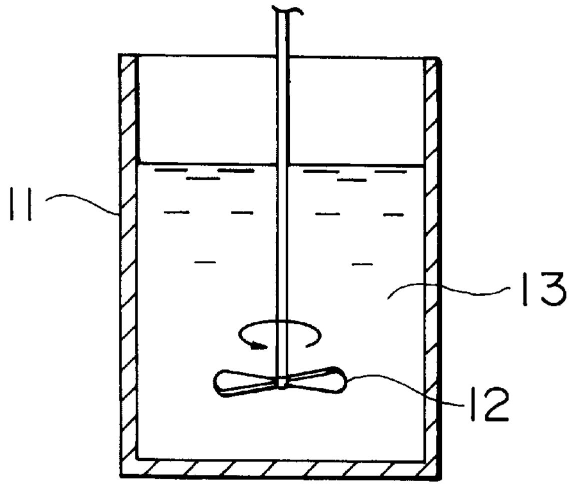
FIG. 3 is a sectional view of a vessel in which a slurry is prepared to produce a preform structure.

To produce a preform structure 5, a first of all, a slurry is prepared. As shown in FIG. 3, reinforcing materials including $TiO_2$ particles and aluminium borate whiskers, burning-away powders and liquid such as water are poured into a vessel 11 with a bottom surface and are then mixed by mixing blades 12 so that a slurry 13 is obtained. During the preparation of the slurry, inorganic binders having a volume ratio of 3% relative to the volume of the reinforcing materials are preferably additionally mixed. High-molecular coagulant and acetic acid in water are added as addition agents.

Black lead powders, resin powders and the like are preferable as the burning-away powders, and silica sols, alumina sols and the like are preferable as the inorganic binders.

Figure 4:
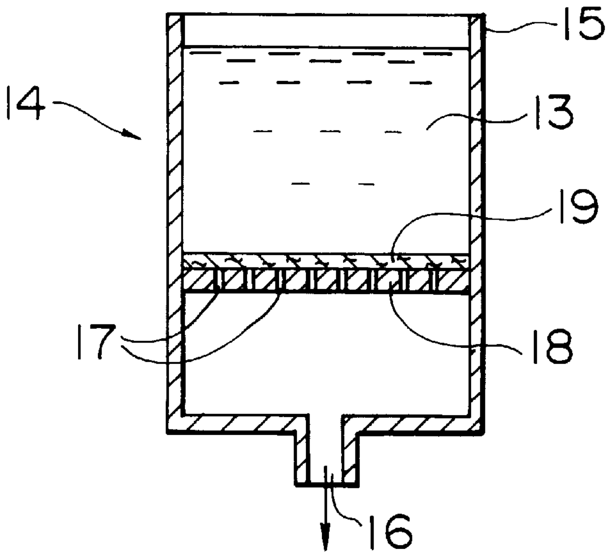
FIG. 4 is a sectional view of a filtration equipment for filtering liquid within the slurry.

After the above, as shown in FIG. 4, the liquid components such as water in the slurry 13 are filtered or dehydrated by a filtration equipment 14. The filtration equipment 14 is provided with a vessel 15 with a bottom surface, a suction port 16 disposed on the bottom surface, a plate member 18 having many slits 17 for dehydration and fixed horizontally at about the center of a vertical direction of the vessel 15 and a filter paper 19 disposed on the upper surface of the plate member 18. After pouring the slurry 13 on the filter pager 19 in the vessel 15, a vacuum suction force is applied to the suction port 16. Thus, the liquid components such as the water and the like are filtered by both the filter paper 19 and the respective slits 17 of the plate member 18, so that a dehydrated structure 21 (see FIG. 5) is obtained.

Figure 5:
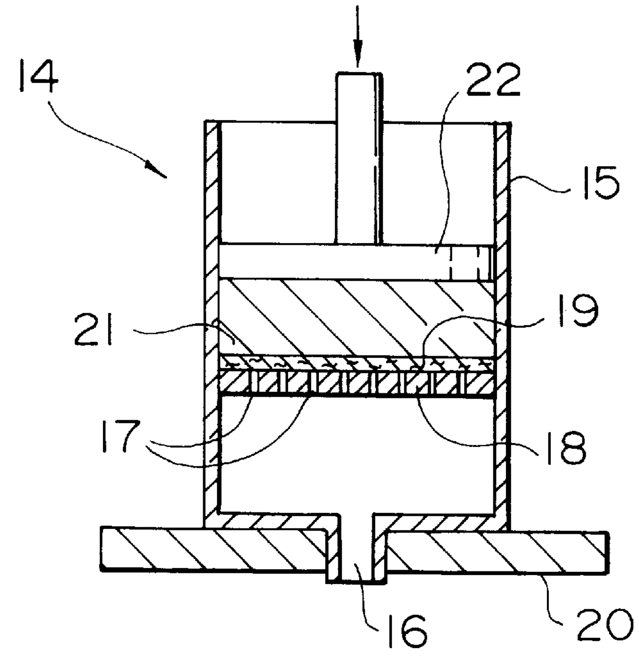
FIG. 5 is a sectional view of a vessel in which a dehydrated structure is pressed.

Thereafter, as shown in FIG. 5, the dehydrated member 21 is squeezed or pressed. Namely, the filtration equipment 14 having the dehydrated member 21 therewithin is disposed on a stationary table 20, and then the dehydrated member 21 is squeezed or compressed from the upper portion thereof by a punch 22 so that the compression molded preform structure 5 having a desired shape is obtained.

If the vacuum suction pressure is adjusted during the above-mentioned filtering process so that the dehydrated member 21 including the burning-away powders has a volume ratio of 10%, the same effect as that of the compression process can be obtained and therefore the above-mentioned compression process may be omitted.

Thereafter, the dehydrated member 21 is dyed and then sintered in two steps. In the first step of the sintering process, by setting the temperature so that complete burning-away of the powders is possible, the burning-away powders in the dehydrated member 21 completely burned away. In the second step, by setting the temperature higher than that in the first step, the $TiO_2$ particles and the aluminium borate whiskers in the dehydrated structure 21 are sintered so that the $TiO_2$ particles are bound with the aluminium borate whiskers. Thus, the preform structure 5 is obtained under the condition that the $TiO_2$ particles are adhered on the surfaces of the aluminium borate whiskers.

The obtained perform structure 5 has pores or voids where the burning-away powders were previously present, and therefore the volume ratio of the reinforcing materials relative to the whole volume of the preform structure 5 is decreased by the volume of the burning-away powders. As a result, by varying the amount of the burning-away powders, the volume ratio of the reinforcing materials can be controlled and decreased. Further, the $TiO_2$ particles are bound not only each other but also by the homogeneously dispersed aluminium borate whiskers and therefore the binding of the $TiO_2$ particles is strengthened more than the reinforcing material including only $TiO_2$ particles, the strength of the preform structure 5 can be maintained even if the volume ratio becomes small. As a result, without decreasing the strength of the preform structure 5, the volume ratio of the reinforcing materials can be decreased, and the molten metal easily infiltrated into the pores or voids in the preform structure 5 during the casting process of the preform structure 5. Therefore the preform structure 5 can be prevented from being broken during the casting process.

Further, by additionally adding or mixing the inorganic binders, the $TiO_2$ particles are sintered with the aluminium borate whiskers through the inorganic binders. Therefore, the bindings of the $TiO_2$ particles with each other and the bindings of the $TiO_2$ particles and the aluminium borate whiskers are much further strengthened. As a result, even if the sintering temperature is relatively low, the strength of the preform structure 5 can be maintained, and the strength of the preform structure 5 can be further enhanced if the sintering temperature is the same as that in the case where the inorganic binders are not added.

Next, a method for producing the piston component A by using the preform structure 5 above-mentioned will be described.

Figure 6:
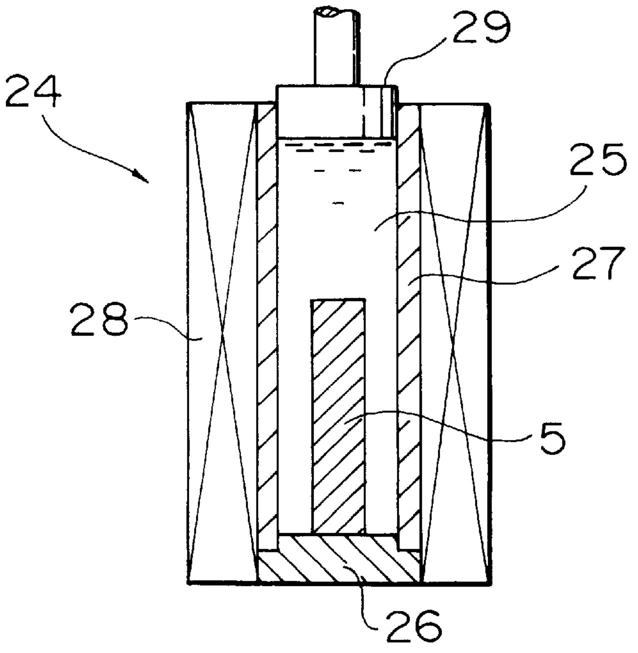
FIG. 6 is a sectional view Of an aluminium casting machine for an aluminium casting by which the preform structure and an aluminium or alloy are composited.

As shown in FIG. 6, an aluminium casting machine 24 is provided which includes a metal mould or die 26 at its bottom, a metal mould or die 27 at its side and a heater 28 at its circumference. The preform structure 5 is set within the aluminium casting machine 24, and the metal moulds 26,27 and the preform structure 5 are heated to and maintained at a predetermined temperature. Then, a molten aluminium or aluminium alloy (or molten metal) 25 is poured into the inside of the casting machine 24 enclosed by the metal moulds 26,27, and the molten metal 25 is compressed from above by a punch 29. This casting pressure is adjusted to be about 100 MPa. At this time, it might be assumed that the preform structure 5 would be broken or deformed by the compression pressure since the reinforcing material volume ratio is equal to or less than 30% relative to the whole volume of the preform structure. However, according to the present invention, the preform structure 5 has enough strength to resist the pressure of about 100 MPa, and therefore the casting can be carried out without the breaking and the deformation of the preform structure 5. The obtaining of the desired strength for the preform structure 5 is assured by the aluminium borate whiskers homogeneously dispersed between the $TiO_2$ particles.

By compressing the molten metal 25, the molten metal 25 is infiltrated into the pores or voids in the preform structure 5, and thus the preform structure 5 and the molten metal 25 are composited. Thereafter, the molten metal 25 solidifies and the piston component A partially reinforced with the $TiO_2$ particles is finally obtained.

Even if the casting pressure is equal to or less than 100 MPa, the preform structure 5 and the molten metal 25 can be composited under the pressure of about 1 MPa.

According to the above-mentioned method, since the preform structure 5 has the pores or voids into which the molten aluminium or aluminium alloy 25 is easily infiltrated and the strength of the preform structure 5 is maintained by the aluminium borate whiskers, the piston component A partially reinforced with the reinforcing material or the $TiO_2$ particles can be obtained by the casting process while it is assured that the breaking and deformation of the preform structure 5 is prevented.

In the above-mentioned embodiment, the piston ring grooves 1 are respectively made of the preform structures 5 including the $TiO_2$ particles and the aluminium borate whiskers. Therefore, since the $TiO_2$ particles have a good wear and abrasion resistance and are low in cost and the aluminium borate whiskers have a high strength which enhances the strength of the combinations of the $TiO_2$ particles, the wear and abrasion resistance and the strength of the piston component A can be enhanced without increasing the cost thereof. Piston rings with C-shaped cross sections are fitted into the respective piston ring grooves 1, and the piston rings and the upper and bottom surfaces of the grooves 1 produce much friction when the piston components A move up and down in cylinders. However, since the piston component A has an improved wear and abrasion resistance, the piston component A has improved durability.

Further, a heat treatment such as T6 heat treatment is preferably carried out on the composite piston component A. If such heat treatment is not carried out, an Al—Ti—S compound, which is a brittle intermetallic compound and is created by titanium being combined with silicon and aluminium contained in the aluminium and aluminium alloy, is produced. On the other hand, if such heat treatment is carried out, the Al—Ti—S compound is produced by titanium being easily combined with silicon and aluminium contained in the aluminium and aluminium alloy. However, since the aluminium borate whiskers are homogeneously dispersed in the reinforcing material, the whiskers help to compensate for the brittleness of the Al—Ti—S compound and therefore the strength of the piston component A can be prevented from being decreased. Further, since the Al—Ti—S compound increases the hardness of the piston component A, the wear and abrasion resistance of the piston component A can be further improved.

In the above-mentioned embodiments, the reinforcing material includes only the $TiO_2$ particles and the aluminium borate whiskers. According to another embodiment of the present invention, alumina or aluminium oxide short fibers, which have larger diameters and longer lengths than those of the aluminium borate whiskers, and potassium titanate whiskers, which have a higher sintering property than the aluminium borate whiskers and smaller diameters and shorter lengths than those of the aluminium borate whiskers, may be added or mixed as second whiskers in the reinforcing materials in addition to the $TiO_2$ particles and aluminium borate whiskers. In this embodiment, the volume ratios of the alumina short fibers and the potassium titanate whiskers are respectively equal to or less than 5% relative to the whole volume of the preform structure, and the volume ratio of the aluminium borate whiskers is 10–30% relative to the volume of the $TiO_2$ particles.

According to this embodiment, since the $TiO_2$ particles are sintered with the aluminium borate whiskers through the inorganic binders which are bound with the alumina short fibers, the wear and abrasion resistance of the piston component A is very much improved by additionally mixing a small amount of the alumina short fibers. The air permeability between the alumina short fibers is further improved by additionally mixing potassium titanate whiskers, since the potassium titanate whiskers are of about the same size as that of the $TiO_2$ particles and have a high sintering property, and therefore the potassium titanate whiskers are not only easily adhered to the aluminium borate whiskers, $TiO_2$ particles and the alumina short fibers but also greatly sintered near the aluminium borate whiskers, $TiO_2$ particles and the alumina short fibers. That is, the $TiO_2$ particles are binded with both of the aluminium borate whiskers and the potassium titanate whiskers through the inorganic binders which is binded with the alumina short fibers, and the $TiO_2$ particles are directly binded with the potassium titanate whiskers. In this embodiment, the volume ratio of the alumina short fibers is equal to or less than 5% relative to the whole volume of the preform structure, since the strength and the air permeability of the preform structure 5 are respectively decreased and the homogeneity of the $TiO_2$ particles is lowered when the volume ratio of the alumina short fibers is greater than 5%. The volume ratio of the potassium titanate whiskers is equal to or less than 5% relative to the whole volume of the preform structure, since the preform structure is softened and therefore easily compressed and broken during the compositing process when the volume ratio of the potassium titanate whiskers is greater than 5%. When the volume ratio of the aluminium borate whiskers is less than 10% relative to the volume of the $TiO_2$ particles, the strength and the air permeability of the preform structure 5 can not be improved, which i s the same as the case where the reinforcing material includes only the $TiO_2$ particles and aluminium borate whiskers. On the other hand, when this volume ratio is greater than 30%, the rigidity of the preform structure 5 is further lowered and therefore the preform structure is easily broken during the compositing process, since the alumina short fibers and the potassium titanate whiskers are further mixed. As a result, the volume ratio of the aluminium borate whiskers is preferably determined to be 10–30% relative to the volume of the $TiO_2$ particles so that the strength of the preform structure 5 can be maintained and the air permeability thereof can be further improved.

In the above-mentioned embodiments, the preform structures 5 are provided within the piston ring grooves 1 of the piston component A, and the base metal is reinforced with the reinforcing preform structures. The present invention may be applied to other components which need a good wear and abrasion resistance such as brake rotor disks in a braking system of an automobile and valve lifters of an engine.

In the above-mentioned embodiments, only some portions of the components such as the piston ring grooves 1 are reinforced by, or composited with the reinforcing material. The present invention may be also applied to the components which are reinforced entirely.

EXAMPLES

First, a preform structure was made by the above-mentioned method. The ceramic particles used were TiO2 particles, available from Wako Junyaku Kogyo kabushikikaisha and having an average diameter of 0.3 μm, the whiskers were aluminium borate whiskers (tradename "ALBOREX-M12"), available from Shikoku Kasei Kogyo Kabushikikaisha, and having fibers 0.5–1.0 μm in diameter and 10–30 μm in length, and the burned-away property powders were graphite powders, available from Nishimura Kokuen Kabushikikaisha, and having an average diameter of 45 μm. These $TiO_2$ particles, aluminium borate whiskers and graphite powders were mixed with 500 cc of water. The volume ratio of the aluminium borate whiskers was 25% relative to the volume of the $TiO_2$ particles. Silica sols as inorganic binders were added so as to have a volume ratio of 3% relative to the total volume of $TiO_2$ particles and aluminium borate whiskers. The sintering temperature was varied in the range of 800° C.–1200° C., and the sintering period was 2 hours. The obtained preform structures each had a dimension of 62*36*15 mm, and three kinds of preform structures, whose respective reinforcing materials had volume ratios (Vf) of 8%, 13% and 24% relative to the whole volume of the preform structures, were made.

In order to obtain the predetermined volume ratios (Vf) of the reinforcing materials relative to the whole volume of the preform structures, the respective mixing ratios of the $TiO_2$ particles, the aluminium borate whiskers and the graphite powders were determined taking into consideration that the ratio of the pores or voids is about 65% before the graphite powders are burned away, that is, the total volume ratio of the reinforcing materials and graphite powders is about 35%. Namely, in order to obtain for example 13% Vf, if the volume ratio of the reinforcing materials ($TiO_2$ particles+aluminium borate whiskers) is set as 1:2 relative to the volume of the graphite powders, and then the reinforcing materials and graphite powders are added into water, the total volume ratio of the $TiO_2$ particles and aluminium borate whiskers becomes about 13%, which is ⅓ of 35%. Thus, the amounts of the graphite were varied based on the desired volume ratios of the reinforcing materials.

Figure 7:
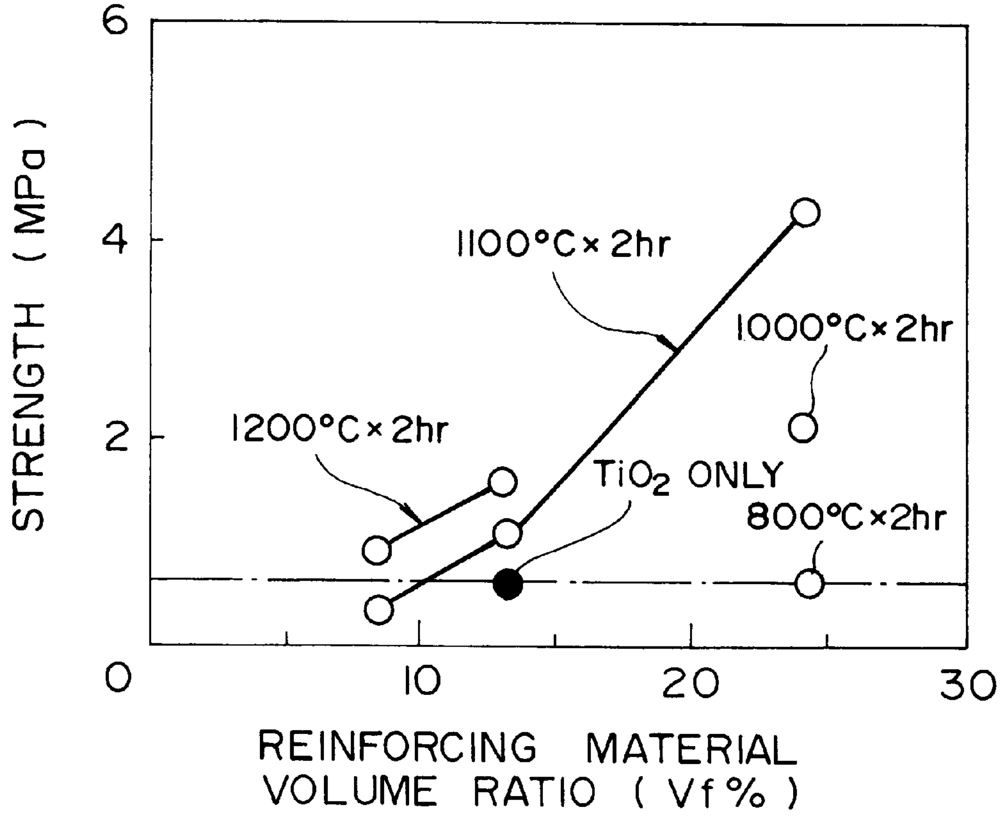
FIG. 7 is a graphical representation showing a relationship between reinforcing material volume ratios and strengths of preform structures.

Next, the compression strengths of the respective preform structures were measured as shown in FIG. 7. For the purpose of comparison, the preform structure including only $TiO_2$ without whiskers as a reinforcing material is also shown in FIG. 7. In FIG. 7, the strength indicated by a dashed line is the minimum strength necessary for conducting an aluminium casting. It is understood that this strength decreases as the volume ratio (Vf) becomes smaller, however, according to the examples of the present invention, the aluminium casting can be conducted under the sintering temperature of 1200° C. even if the Vf is 8%, and the strength is maintained by the whiskers even if the sintering temperature is relatively low when the Vf is large.

Figure 8:
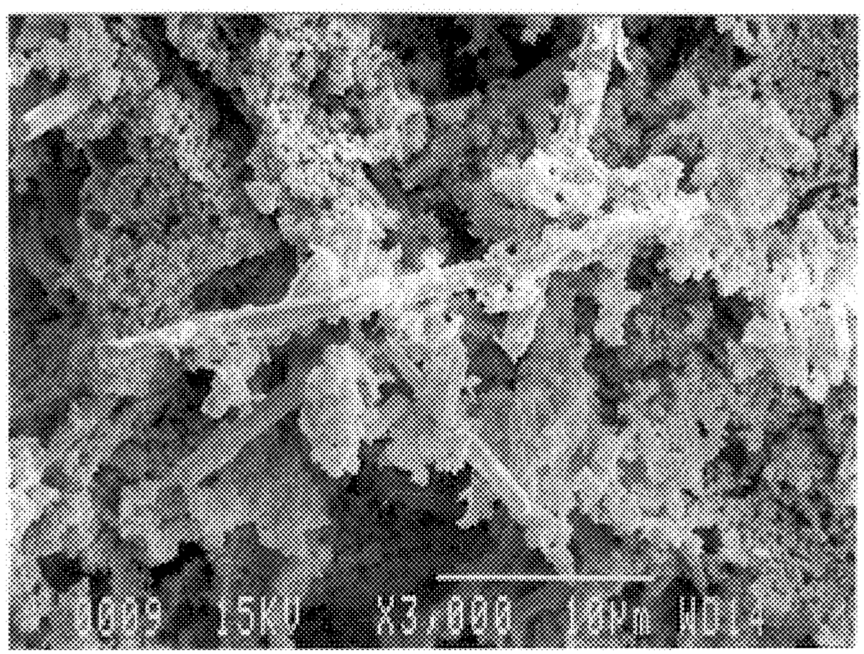
FIG. 8 is a microphotograph showing an inside structure of a preform structure in which a volume ratio of reinforcing materials is 13% according to an example of the present invention.
Figure 9:
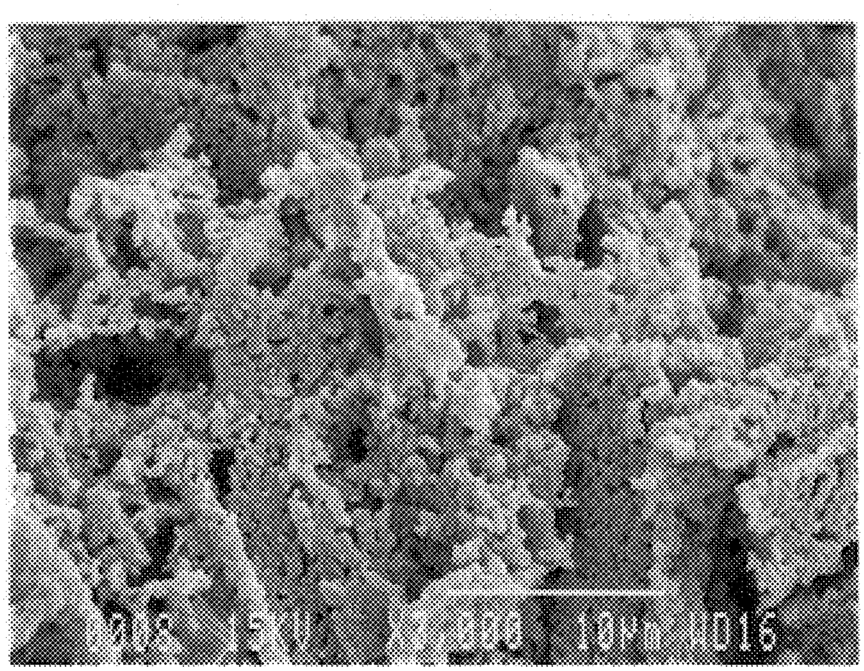
FIG. 9 is a microphotograph showing an inside structure of a preform structure in which a volume ratio of reinforcing materials consisting of $TiO_2$ particles without whiskers is 13%.

FIG. 8 shows an inside structure of the preform structure having 13% Vf. FIG. 9 shows an inside structure of the preform structure of a comparative example having 13% Vf and including only the $TiO_2$ particles without whiskers. The inside structures shown in FIGS. 8 and 9 are both magnified 3000 times. It is understood that the whiskers work as scaffolding members and the $TiO_2$ particles with each other are combined each other and therefore the strength of the preform structure is increased.

Next, aluminium castings were carried out in the above-mentioned manner to produce three kinds of preform structures, and then three kinds of composite materials, in which molten aluminium or aluminium alloys were infiltrated into the preform structures and then the aluminium or aluminium alloys were composited with the preform structures, were obtained. The aluminium castings were carried out under the conditions that the aluminium or aluminium alloys were the above-mentioned AC8A, the temperature of the molten metals was 760° C., the temperatures of the metal moulds or dies was 260° C., the temperature of the preform structures was 300° C., and the applied pressure was 100 MPa. Further, after the compositing process, the T6 thermal treatment was carried out. That is, the composite materials were maintained for about four hours at 510° C., maintained for about ten hours at 170° C., and finally cooled down by air.

Thereafter, round bar test pieces with 5 mm diameters in parallel portions thereof were made of the three kinds of the composite materials. Tensile tests were carried out on the round bar test pieces at 0.0177 m/sec crosshead speed and at two temperatures, room temperature and a high temperature (260° C.). In the test under the high temperature, after the test pieces were preheated at 260° C. for 20 hours, the measurements were taken.

Figure 12:
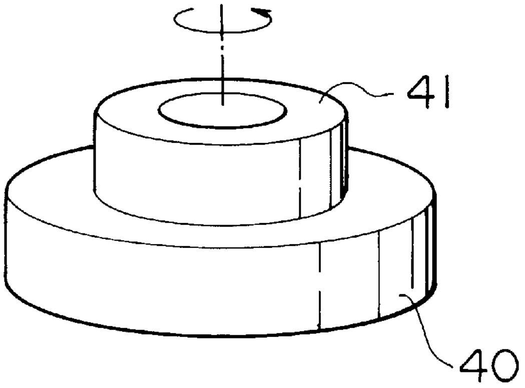
FIG. 12 is a perspective view showing a disk and a ring on which abrasion tests are carried out.

Further, abrasion tests were done. That is, disk test pieces 40 were made of the composite materials, and as shown in FIG. 12 a ring 41, composed of SCr40(HRc45), was put on each of the respective disk test pieces 40. The disk test pieces 40 were fixed, and the rings 41 were rotated along an axis under a 10 MPa surface pressure, 0.5 m/sec peripheral speed, and 100° C. lubricating oil temperature. When the total peripheral distance reached 5000 m, the abrasion losses in the disk test pieces 40 and the rings 41 were measured.

Figure 10:
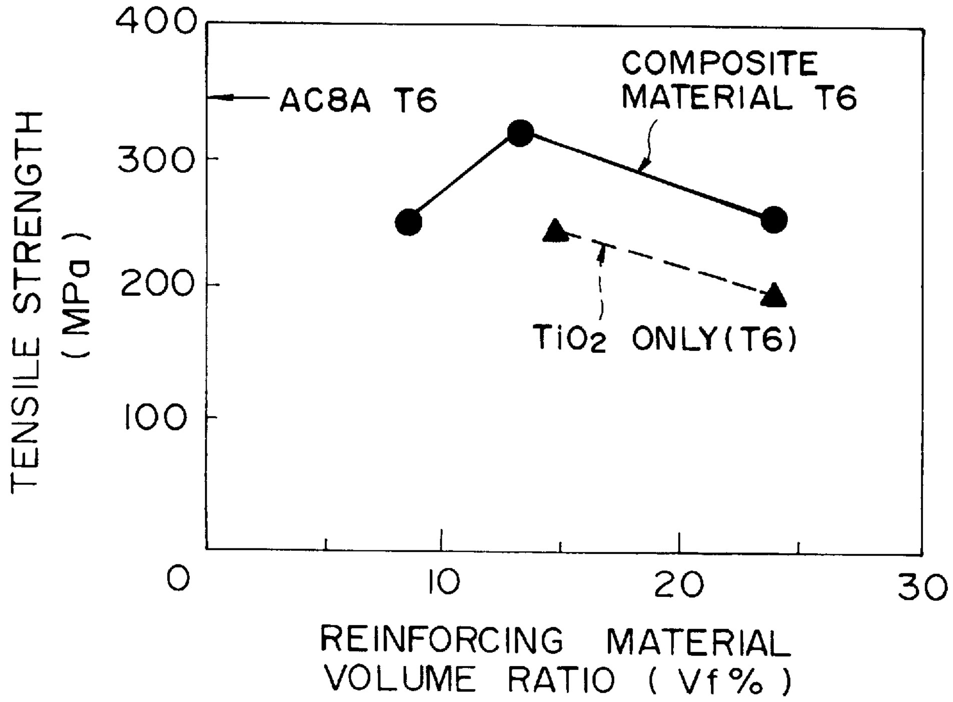
FIG. 10 is a graphical representation showing a relationship between reinforcing material volume ratios and tensile strengths of composite materials at room temperature.
Figure 11:
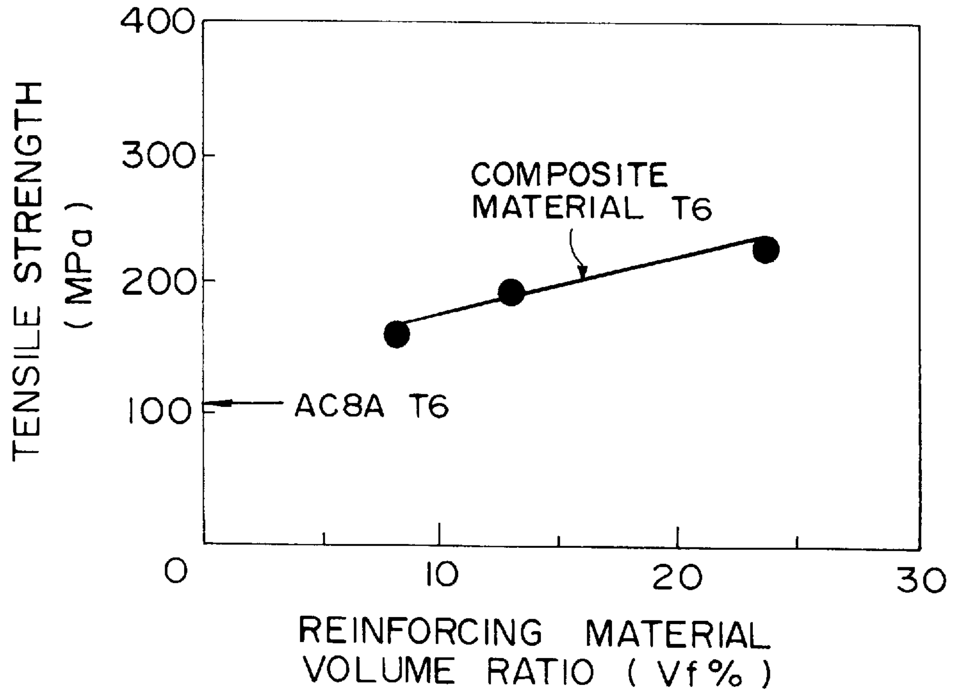
FIG. 11 is a graphical representation showing a relationship between reinforcing material volume ratios and strengths of composite materials at a high temperature.

FIGS. 10 and 11 respectively show the measurements of the tensile strength tests of composite materials performed at room temperature and the high temperature. In FIG. 10, for comparison purposes, the tensile strengths of comparative examples at room temperature are also shown. The comparative examples were composite materials whose reinforcing material including only $TiO_2$ particles without whiskers. As shown in FIG. 10, in the tensile strength tests at room temperature, the tensile strengths of the composite materials of the examples were higher than those of the comparative examples, though the tensile strengths of the examples were a little bit lower than those of the composite materials whose base metal was AC8A and to which the heat treatment T6 were done. As shown in FIG. 11, in the tensile strength tests at the high temperature, the tensile strengths of the composite materials of the examples were higher than those of the composite materials whose base metal was AC8A and on which the heat treatment T6 was conducted. Thus, coagulations of the $TiO_2$ particles were improved by the aluminium borate whiskers and therefore the tensile strengths were especially enhanced under the high temperature.

Figure 13:
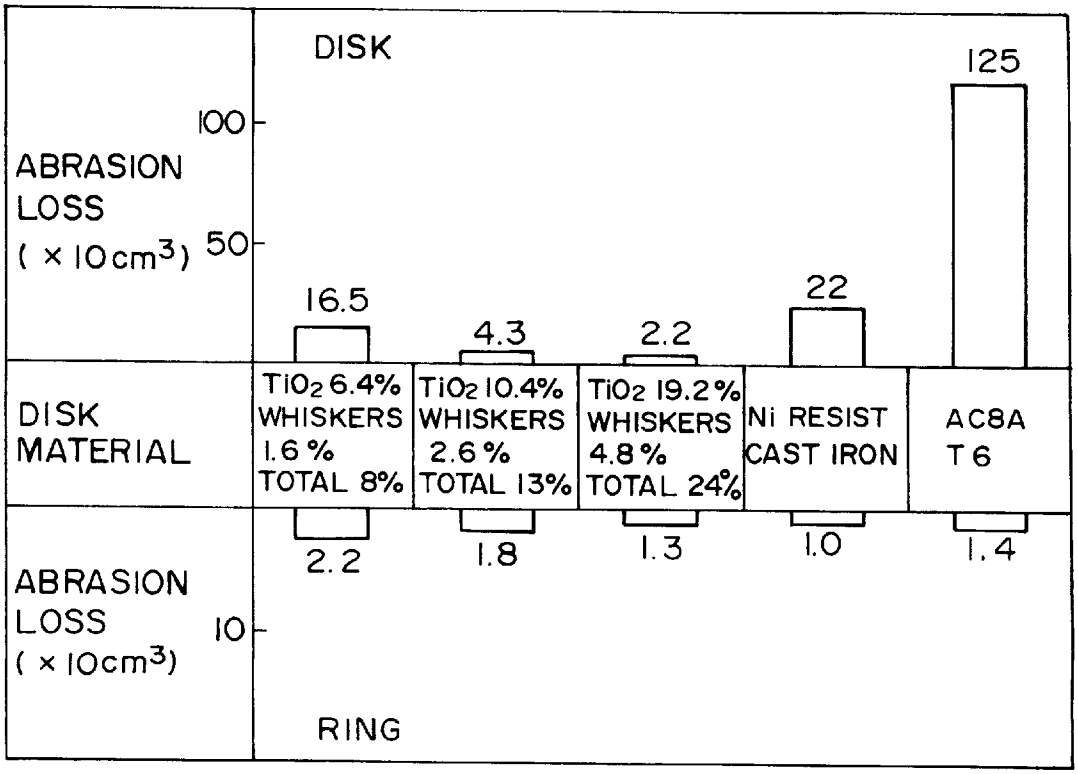
FIG. 13 is a graphical representation showing a relationship between disk materials and abrasion losses of disks and rings.

FIG. 13 shows the measurements of the abrasion tests. For comparison purposes, the measurements of the abrasion tests of the base metal AC8A and a Ni-resist cast iron, which was usually used as piston ring grooves of a piston component, are also indicated in FIG. 13. As clearly shown in FIG. 13, the wear and abrasion resistances of the examples including the $TiO_2$ particles and the aluminium borate whiskers were better than those of the Ni-resist cast ion and these resistance of the examples were much better within a range of equal to or more than 13% Vf. It is therefore understood that the composite materials of the examples are more suitable for use as reinforcing materials of the piston ring grooves than the conventional Ni-resist cast iron.

Figure 14:
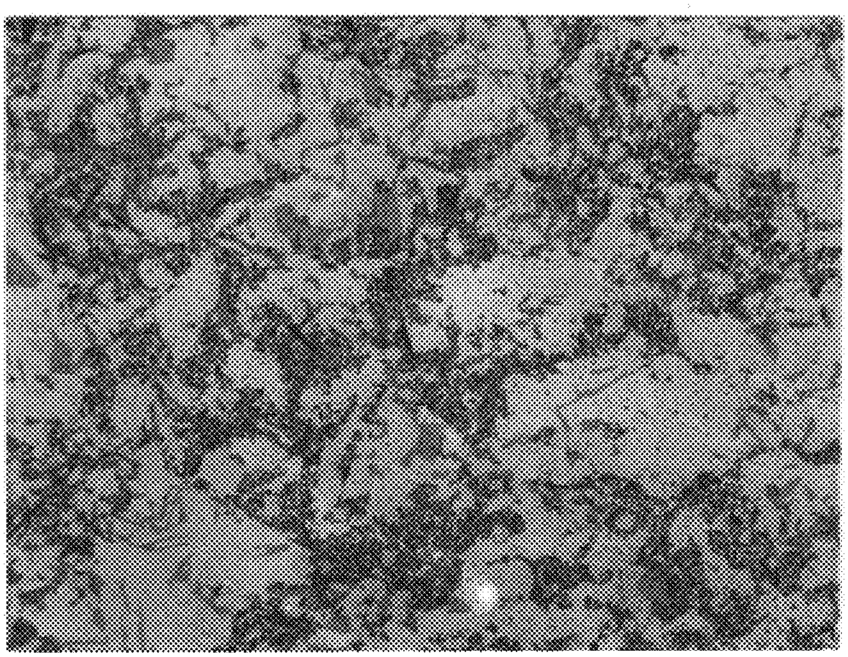
FIG. 14 is a microphotograph showing an inside structure of a composite material in which a volume ratio of reinforcing materials is 8% according to an example of the present invention.
Figure 15:
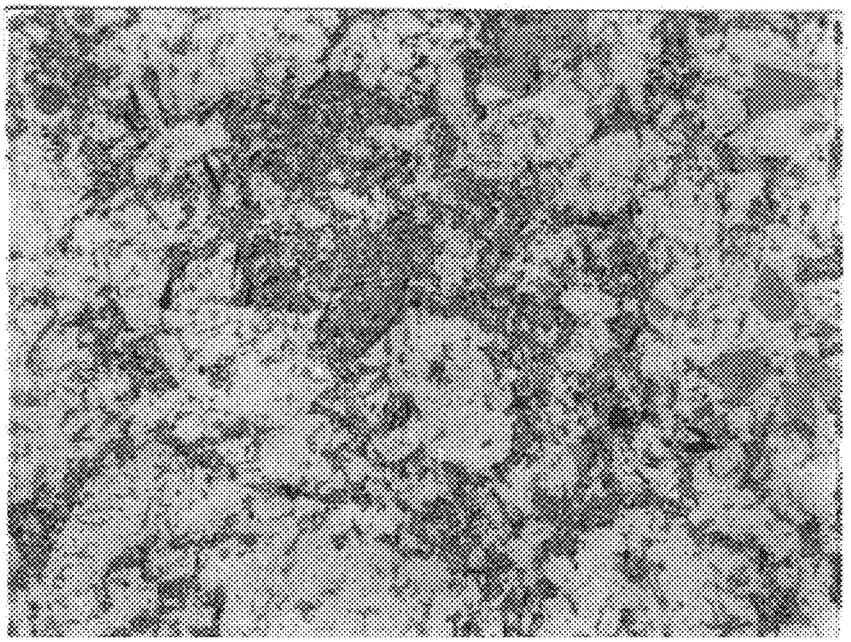
FIG. 15 is a microphotograph showing an inside structure of a composite material in which a volume ratio of reinforcing materials is 13% according to an example of the present invention.
Figure 16:
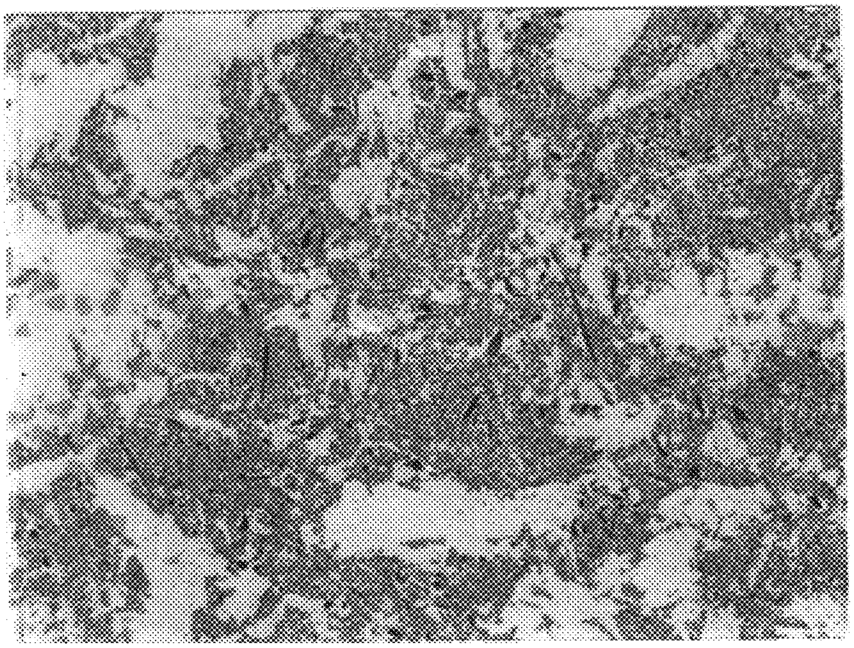
FIG. 16 is a microphotograph showing an inside structure of a composite material in which a volume ratio of reinforcing materials is 24% according to an example of the present invention.
Figure 17:
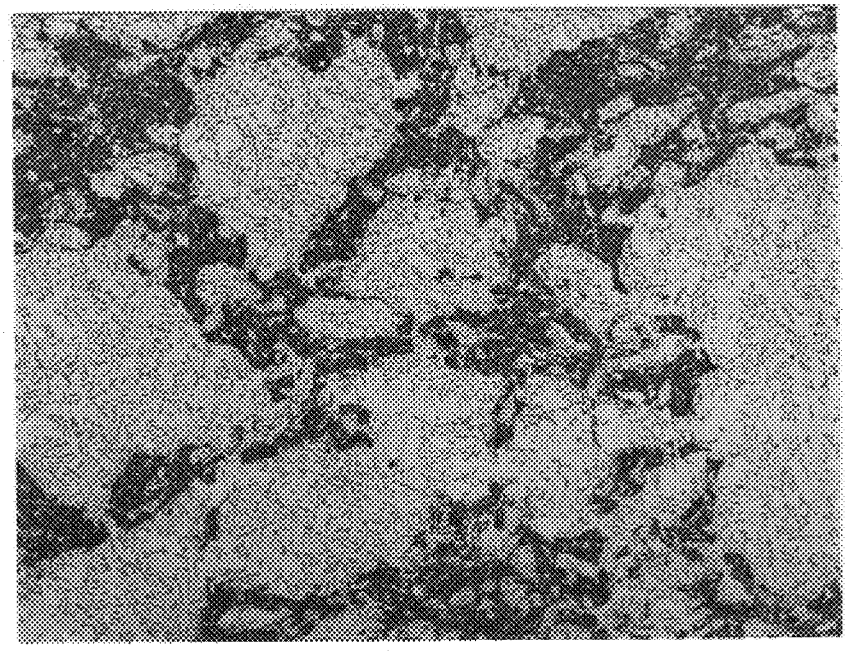
FIG. 17 is a microphotograph showing an inside structure of a composite material including only $TiO_2$ particles without whiskers.

FIGS. 14–16 show the structures (400 magnification) of the respective composite materials of the examples of the present invention, whose respective volume ratios (Vf) are 8%, 13% and 24%. For comparison purposes, FIG. 17 shows the structure (100 magnification) of a comparative example including only $TiO_2$ without whiskers. In FIGS. 14–17, black portions show concentrations of the $TiO_2$ particles, and white portions show the composited aluminium borate whiskers. It is understood from FIGS. 14–16 that the $TiO_2$ particles and the aluminium borate whiskers are homogeneously dispersed in the examples. That is, the desired strengths of the composite materials are homogeneously kept throughout the respective examples. It was found by a X-ray analysis that the brittle compound Ti—Al—Si was produced by the T6 heat treatment in an example having 24% Vf. Since the compound Ti—Al—Si generally increases hardness of a material, it can be proved by this fact that good abrasion resistances of the composite materials of the examples can be obtained in the abrasion tests. On the other hand, it is also understood that the desired strengths of the composite materials were maintained by the homogeneously dispersed aluminium borate whiskers, though the strengths might be generally decreased by the brittleness.

Figure 18:
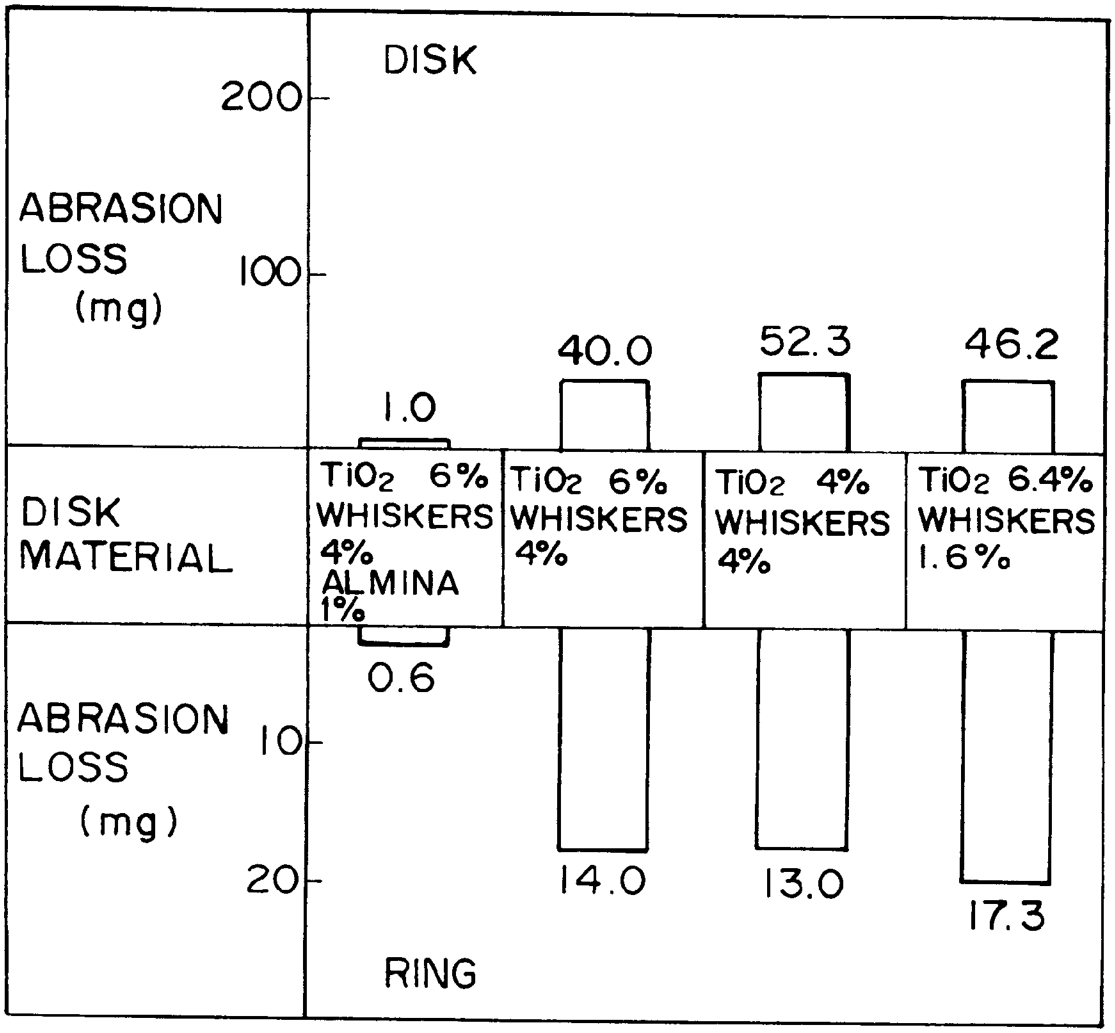
FIG. 18 is a graphical representation showing a relationship between disk materials and abrasion losses of disks and rings.

Further, by mixing alumina short fibers having diameters of 5–10 $\mu$m and lengths of 200–500 $\mu$m in addition to the $TiO_2$ particles and the aluminium borate whiskers, composite materials were made by the above-mentioned method. The respective volume ratios of the TiO2 particles, aluminium borate whiskers and alumina short fibers relative to the volumes of the preform structures were 6%, 4% and 1%. Abrasion tests were carried out in the same manner explained above on the composite materials of the examples and abrasion losses were measured. FIG. 18 shows these measurements of the examples. As shown in FIG. 18, it is understood that wear and abrasion resistances of the composite materials of the examples including, in addition to the $TiO_2$ particles and the aluminium borate whiskers, the alumina short fibers of about 1% were much better than those of the examples including only the $TiO_2$ particles and the aluminium borate whiskers.

Next, a first preform structure and a second preform structure were made. The first preform structure includes as reinforcing materials $TiO_2$ particles, aluminium borate whiskers and alumina short fibers, and the second preform structure includes as reinforcing materials potassium titanate whiskers whose having diameters of about 0.3 $\mu$m and lengths of about 10 $\mu$, in addition to the reinforcing materials in the first perform structure. Both of the first and second preform structures were respectively sintered at a sintering temperature of 1100° C. for two hours. The volume ratios of the $TiO_2$ particles, the aluminium borate whiskers and the alumina short fibers relative to the volumes of the respective first and second preform structures were respectively 7%, 2% and 1.5%, and the volume ratio of the potassium titanate relative to the volume of the second preform structure was 1%. Thus, the volume ratio (Vf) of the reinforcing materials in the first preform structure relative to the whole volume of the first preform structure was 10.5%, and the volume ratio (Vf) of the reinforcing materials in the second preform structure relative to the whole volume of the second preform structure was 11.5%. The dimensions of the first and second preform structures were respectively 58*36*15 mm.

Figure 19:
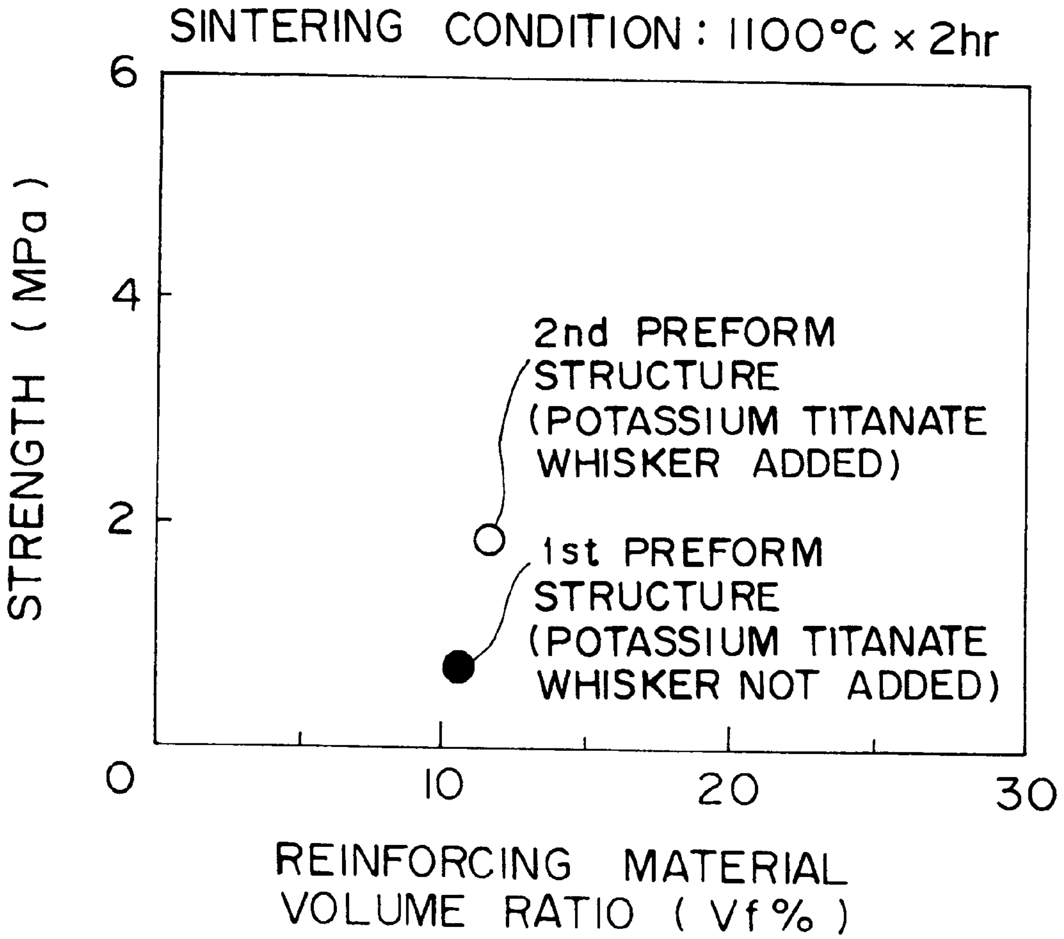
FIG. 19 is a graphical representation showing a relationship between reinforcing material volume ratios and strengths of first and second preform structures.

Thereafter, the compression strengths of the first and second preform structures were measured, as shown in FIG. 19. The strength of the preform structure could be maintained even if the alumina short fibers were added to increase the wear and abrasion resistance, and the strength of the second preform structure in which the potassium titanate whiskers were additionally added was much more increased than that of the first preform structure.

Figure 20:
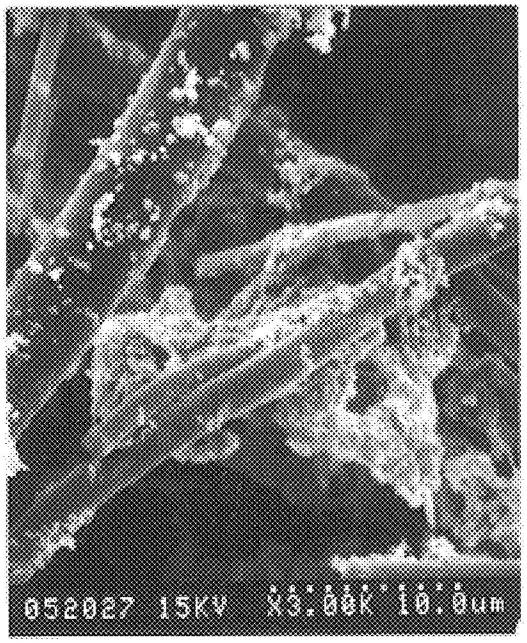
FIG. 20 is a microphotograph showing an inside structure of a first preform structure.
Figure 21:
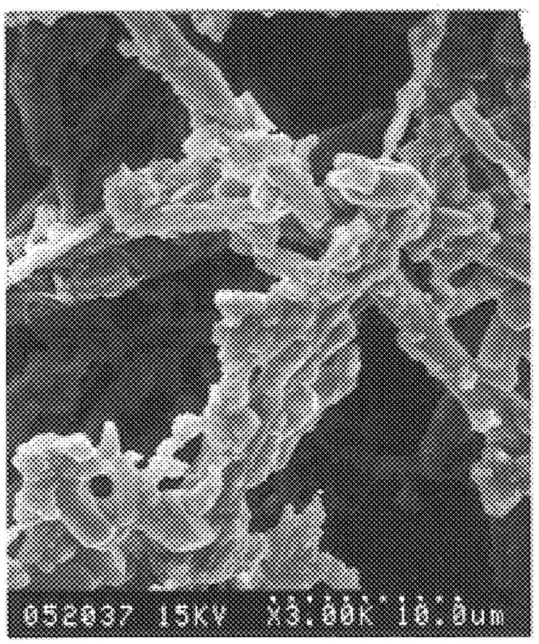
FIG. 21 is a microphotograph showing an inside structure of a second preform structure.

FIGS. 20 and 21 respectively show the structures (3000 magnification) of the first and second preform structures. In FIG. 20, thick and long portions are alumina short fibers, thin and short portions are aluminium borate whiskers, and white portions are $TiO_2$ particles. As can be seen in these Figures, many more $TiO_2$ particles as well as potassium titanate whiskers in the second preform structure were adhered to the aluminium borate whiskers and the alumina short fibers than in the case of the first preform structure, and therefore the air permeability of the second preform structure was better than that of the first preform structure.

Still further, aluminium castings were respectively carried out on the first and second preform structures, and first and second composite materials were obtained by the aluminium or aluminium alloy being infiltrated into the first and second preform structures. The aluminium castings were carried out under the conditions that the aluminium or aluminium alloy was AC8A, the molten metal temperature was 760° C., the metal mould or die temperature was 260° C., and the applied pressure was 150 MPa.

The hardness and tensile strength of the first and second composite materials were measured, and for comparison purposes, those of the AC8A itself were also measured. The measured hardness and tensile strength of the first composite material were respectively Hv110–115 and 220–230 MPa and the measured hardness and tensile strength of the second composite material were respectively Hv115–120 and 220–240 MPa. On the other hand, the measured hardness and tensile strength of the AC8A were respectively Hv80 and 170 MPa. As a result, it is understood that the hardness and tensile strength of the first composite material were nearly equal to those of the second composite material, and those of the first and second composite materials were much better than those of the AC8A or the base material.

Figure 22:
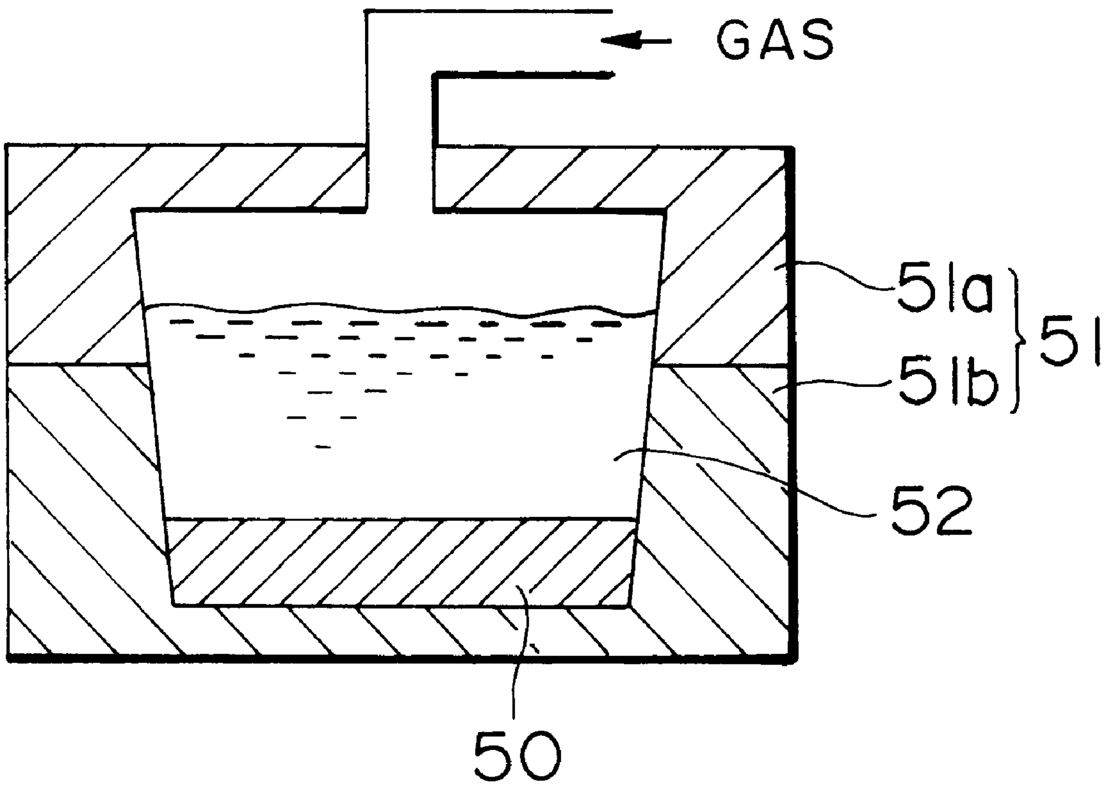
FIG. 22 is a sectional view showing a third preform structure and an aluminium or alloy which have been composited by a gas pressure casting method.

Next, a third preform structure was made which was the same as the above-mentioned second preform structure except the shape thereof. The third preform structure was composited with the AC8A by using the gas pressure casting method, and thus a third composite material was obtained. That is, as shown in FIG. 22, a third preform 50, which was a disk having a 95 mm diameter and 15 mm thickness, was set on a bottom surface of a metal mould 51 composed of an upper mould 51*a* and a lower mould 51*b*. A molten AC8A or molten metal 52 was poured onto the third preform structure 50, and the molten metal 52 was pressurized at 0.5 MPa by introducing gas such as air or nitrogen gas. Thus, the third preform structure 50 was composited with the AC8A and the third composite material was finally obtained. The temperatures of the molten metal 52 and the metal mould 51 and the preheating temperature of the third preform structure were respectively 770° C., 110° C. and 70° C.

Hardness of the third composite material was measured, and it was found to be Hv110–115, which was the same as that of the second composite material made by the regular pressurization casting (150 MPa). The third composite material made under the pressure 0.5 MPa had the same hardness as the second composite material made under the high pressure and the third composite material had a very good air permeability. Since the pressure 0.5 MPa is commonly used in factories and the like, the preform structure can be easily composited without providing new compressors.

When the first preform structure mentioned above, with which the potassium titanate whiskers were not mixed, was composited by the air pressure casting method, the first preform structure was not composited under the pressure less than 1 MPa but composited under the pressure equal to 1 MPa and had a good air permeability.

While the present invention has been illustrated by means of several preferred embodiments and examples, one of ordinary skill in the art will recognize that modifications and improvements can be made while remaining within the spirit and scope of the invention. The scope of the invention is determined solely by the appended claims.

What is claimed is:

1. A preform structure which is used in a composite aluminum or aluminum alloy component in which a base metal of an aluminum or an aluminum alloy is reinforced with reinforcing materials, comprising:

reinforcing materials including ceramic particles, first whiskers, inorganic binders and second whiskers;

the second whiskers having a better sintering properly and smaller diameters and shorter lengths of fibers than those of the first whiskers; and the ceramic particles, the first whiskers, the inorganic binders and the second whiskers are sintered so that the ceramic particles are bonded to both of the first and second whiskers by way of the inorganic binders with the ceramic particles being directly bonded to the second whiskers.

2. A preform structure of claim 1, in which the volume ratio of the first whiskers is 10–40% relative to the volume of the ceramic particles.

3. A preform structure of claim 1, in which the ceramic particles are titanium dioxide, and the first whiskers are aluminum borate whiskers.

4. A preform structure of claim 1, in which the ceramic particles, the first whiskers, the inorganic binders, and short fibers, the short fibers being larger in diameters and lengths than the first whiskers, are sintered so that the ceramic particles are bonded to the first whiskers and the short fibers by way of the inorganic binders.

5. A preform structure of claim 4, in which the short fibers have a volume ratio of equal to or less than 5% relative to the whole volume of the preform structure.

6. A preform structure of claim 4, in which the short fibers are alumina short fibers.

7. A preform structure of claim 1, in which the first whiskers have a volume ratio of 10–30% relative to the volume of the ceramic particles.

8. A preform structure of claim 1, in which the second whiskers have a volume ratio of equal to or less than 5% relative to the whole volume of the preform structure.

9. A preform structure of claim 1, in which the reinforcing materials have a volume ratio of equal to or less than 30% relative to the whole volume of the preform structure.

10. A preform structure of claim 1, in which the second whiskers are potassium titanate whiskers.

11. A preform structure which is used in a composite aluminum or aluminum alloy component in which a base metal of an aluminum or an aluminum alloy is reinforced with reinforcing materials, comprising:

reinforcing materials including ceramic particles, first whiskers, inorganic binders, second whiskers and short fibers;

the first whiskers having a volume ratio of 10–40% relative to the volume of the ceramic particles;

the second whiskers having a better sintering property and smaller diameters and shorter lengths of fibers than those of the first whiskers and having a volume ratio of equal to or less than 5% relative to the whole volume of the preform structure;

the short fibers being larger in diameters and lengths than the first whiskers and having a volume ratio of equal to or less than 5% relative to the whole volume of the preform structure; and the ceramic particles, the first whiskers, the inorganic binders, the second whiskers and the short fibers are sintered so that the ceramic particles are bonded all of the first and second whiskers and the short fibers by way of the inorganic binders with the ceramic particles being directly bonded to the second whiskers.

* * * * *